(12) United States Patent
Margulis et al.

(10) Patent No.: US 6,493,345 B1
(45) Date of Patent: Dec. 10, 2002

(54) SINGLE SENDER PRIVATE MULTICAST SERVER FOR USE WITH LAN EMULATION IN ASYNCHRONOUS TRANSFER MODE NETWORKS

(75) Inventors: David Margulis, Haifa (IL); Meir Morgenstern, Or Yehuda (IL); Haim Rochberger, Netanya (IL)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/392,096

(22) Filed: Sep. 8, 1999

(51) Int. Cl.[7] .......................... H04L 12/28; H04L 12/56
(52) U.S. Cl. .................. 370/395.53; 370/432; 370/390
(58) Field of Search .......................... 370/395.53, 432, 370/390, 395.1

(56) References Cited

U.S. PATENT DOCUMENTS

| | | | | |
|---|---|---|---|---|
| 5,812,552 | A | * 9/1998 | Arora | 370/401 |
| 5,835,481 | A | * 11/1998 | Akyol | 370/216 |
| 5,946,311 | A | * 8/1999 | Alexander | 370/395 |
| 6,223,149 | B1 | * 4/2001 | Margulis | 703/27 |
| 6,324,163 | B1 | * 11/2001 | Alexander | 370/229 |

OTHER PUBLICATIONS

LAN Emulation Over ATM Version 2—LUNI Specification—Letter Ballot, AF–LANE–0084.000.*
CISCO IOS Switching Services Configuration Guide, LAN Emulation Overview, pp. XC–59–65.
LAN Emulation Over ATM Version 2—LUNI Specification—Letter Ballot, AF–LANE–0084.000, pp. 25–26, 29–33, 88–101.
LAN Emulation Over ATM, 1996, pp. 1–11.

* cited by examiner

Primary Examiner—Ajit Patel
Assistant Examiner—Chirag Shah
(74) Attorney, Agent, or Firm—Howard Zaretsky; Paul J. Sutton

(57) ABSTRACT

A system comprising a single sender SMS for forwarding multicast traffic is collocated in the same device as the LEC thus creating an optimal distribution path for multicast traffic. This reduces the latency of transmission of multicast traffic from sender to receivers by eliminating the need to transmit cells from the LEC to the SMS via the network and reassemble cells into frames and segment frames into cells. The SMS functions as a private SMS for exclusive use by the LEC alone. The SMS of the present invention enables a LEC to distribute multicast traffic in a very efficient manner. The LEC communicates with the SMS directly via the operating system internal messaging subsystem or equivalent. The multicast traffic is sent on a P2M connection from the sending LEC via the SMS to all the receiving LECs interested in listening to a given MMAC. In a first embodiment, the LEC internally has knowledge of the existence of the private SMS and is inhibited from issuing a LE_ARP_REQ to find the SMS. The LES is prevented from assigning an LEC to that SMS. In a second embodiment, address and LEC information is predefined for the SMS and propagated to all the SMSs. The LES is directed to permit only a single LEC to be assigned to a SMS preventing the LES from assigning a LEC other than the registered LEC to that SMS.

25 Claims, 11 Drawing Sheets

SINGLE SENDER PRIVATE MULTICAST SERVER FOR USE WITH LAN EMULATION IN ASYNCHRONOUS TRANSFER MODE NETWORKS

FIELD OF THE INVENTION

The present invention relates generally to data communications networks and more particularly relates to a single sender private Selective Multicast Server (SMS) for use with LAN Emulation (LANE) in an Asynchronous Transfer Mode (ATM) network.

BACKGROUND OF THE INVENTION

Asynchronous Transfer Mode

Currently, there is a growing trend to make Asynchronous Transfer Mode (ATM) networking technology the base of future global communications. ATM has already been adopted as a standard for broadband communications by the International Telecommunications Union (ITU) and by the ATM Forum, a networking industry consortium.

ATM originated as a telecommunication concept defined by the Comite Consulatif International Telegraphique et Telephonique (CCITT), now known as the ITU, and the American National Standards Institute (ANSI) for carrying user traffic on any User to Network Interface (UNI) and to facilitate multimedia networking between high speed devices at multi-megabit data rates. ATM is a method for transferring network traffic, including voice, video and data, at high speed. Using this connection oriented switched networking technology centered around a switch, a great number of virtual connections can be supported by multiple applications through the same physical connection. The switching technology enables bandwidth to be dedicated for each application, overcoming the problems that exist in a shared media networking technology, like Ethernet, Token Ring and Fiber Distributed Data Interface (FDDI). ATM allows different types of physical layer technology to share the same higher layer—the ATM layer.

ATM uses very short, fixed length packets called cells. The first five bytes, called the header, of each cell contain the information necessary to deliver the cell to its destination. The cell header also provides the network with the ability to implement congestion control and traffic management mechanisms. The fixed length cells offer smaller and more predictable switching delays as cell switching is less complex than variable length packet switching and can be accomplished in hardware for many cells in parallel. The cell format also allows for multi-protocol transmissions. Since ATM is protocol transparent, the various protocols can be transported at the same time. With ATM, phone, fax, video, data and other information can be transported simultaneously.

ATM is a connection oriented transport service. To access the ATM network, a station requests a virtual circuit between itself and other end stations, using the signaling protocol to the ATM switch. ATM provides the User Network Interface (UNI) which is typically used to interconnect an ATM user with an ATM switch that is managed as part of the same network.

The current standard solution for routing in a private ATM network is described in Private Network Node Interface (PNNI) Phase 0 and Phase 1 specifications published by the ATM Forum. The previous Phase 0 draft specification is referred to as Interim Inter-Switch Signaling Protocol (IISP). The goal of the PNNI specifications is to provide customers of ATM network equipment some level of multi-vendor interoperability.

LAN Emulation

Today, most data traffic in existing customer premises networks travels over legacy LANs. It is desirable to permit these legacy LANs and their embedded infrastructure to operate with new ATM networks currently being deployed. To enable an easier migration path to ATM, the ATM Forum has defined LAN Emulation (LANE) specification that allows ATM networks to coexist with legacy systems. The LANE specification defines a way for an ATM network to emulate a logical Ethernet or Token Ring segment, these currently being the most popular LAN technologies.

LANE service provides connectivity between ATM capable devices and legacy LAN capable devices across an ATM network. Since LANE connectivity is defined at the MAC layer, the upper protocol layer functions of LAN applications can continue to function unchanged after the device joins an emulated LAN. This important feature protects corporate investments in legacy LAN applications.

An ATM network can support multiple independent emulated LAN (ELAN) networks. A network may have one or more emulated LANs wherein each emulated LAN is separate and distinct from the others. Emulated LANs communicate via routers and bridges just as they do in physical LANs. The emulated LAN provides communication of user data frames between its users just as in an actual physical LAN.

Emulation over ATM networks, the LANE Version 1.0 standard drafted by the ATM Forum and incorporated herein by reference, defines the LANE architecture and a set of protocols used by the LANE entities. LANE uses a client/server model to provide its services. A block diagram illustrating prior art Version 1.0 LAN Emulation services available to nodes in an ATM network is shown in FIG. 1. The network, generally reference 10, comprises an ATM network cloud (not shown) which includes a plurality of LECs 14 labeled LEC #1 through LEC #3 and a plurality of nodes 12 labeled node #1 through node #9 connected to LECs #1 through #3. The LECs are connected to a LAN Emulation services block 16 which comprises LECS 18, LES 20 and BUS 22.

The entities defined by the LANE architecture include LAN Emulation Clients (LECs) 14, a LAN Emulation Server (LES) 20, a Broadcast and Unknown Server (BUS) 22 and LAN Emulation Configuration Server (LECS) 18. The LES, BUS and LECS constitute what is referred to as the LANE Service (block 16).

Each LAN Emulation Client (LEC) represents a set of users, as identified by their MAC addresses. A LEC emulates a LAN interface that communicates with higher layer protocols such as IP, IPX, etc. that are used by these users. To achieve this task, the LEC communicates with the LANE Services and to other LECs. LECs communicate with each other and to the LANE Services via ATM Virtual Channel Connections (VCCs). The VCCs are typically Switched Virtual Circuits (SVCs), but Permanent Virtual Connections (PVCs) might also be used for this purpose.

In order for a LEC to participate in an emulated LAN, the LEC must first communicate with an LECS. It may utilize a specific ATM address of the LECS if it knows it, or, as is typically the case, may use the well known address of the LECS to establish communications.

As described previously, the LANE Service comprises several entities: LANE Server (LES), a Broadcast and Unknown Server (BUS) and LAN Emulation Configuration Server (LECS). The LES provides Joining, Address Registration and Address Resolution services to the LECs. Note that a given LES serves only a single emulated LAN.

The LANE BUS is responsible for the distribution of the Broadcast, Multicast and unknown traffic to the LECs that is typically sent by a LEC before the ATM address has been resolved. Note that a given BUS serves only one emulated LAN.

The LECS contains the database used in determining which emulated LAN a device belongs to. Each LEC consults the LECS once, at the time it joins an emulated LAN, to determine which emulated LAN it should join. The LECS assigns the LEC to a given emulated LAN by giving the LEC the ATM address of the LES associated with that particular emulated LAN. Different policies may be utilized by the LECS in making the assignment. The assignment may be based on the LECs physical location, i.e., ATM address, the LEC ID, i.e., the MAC address, or any other suitable criteria. Note that the LECS serves all the emulated LANs defined for the given administrative ATM network domain.

The straightforward implementation of the LANE Version 1.0 specification includes a single LECS for the entire administrative domain and a single LES per emulated LAN. A disadvantage of this implementation is that it suffers from a single point of failure for both the LECS and the LES. Failure of the LECS might take the entire network down while failure of the LES takes the entire emulated LAN down.

A block diagram illustrating the relationship between LEC, LECS, LES and BUS entities in prior art Version 1.0 LAN Emulation services is shown in FIG. 2. Two LECs 30 are shown in communication with each other in addition to an LECS 32, LES 34 and BUS 36. The protocol the LECs use to communicate with each other and to the LAN Emulation services is known as LAN Emulation User to Network Interface (LUNI). The scope of the LUNI is indicated by the dashed line 38.

A characteristic feature of these types of implementations, however, is that when a LES fails, all the LECs connected to it try to rejoin the emulated LAN by connecting to the LECS. The LECS, however, assigns these LECs to the same non operative LES. The connection fails and the process continues endlessly.

The LANE Version 2.0 draft specification addresses the single point of failure problem for the ELAN by defining a distributed architecture for the LANE services. Since the clients (LECs) should be effected by the particular implementation used to provide the services, the ATM Forum decided to split the LANE specification into two sub specifications: (1) LAN Emulation User to Network Interface (LUNI) and (2) LAN Emulation Network to Network Interface (LNNI).

The LUNI specification defines the interface between the LEC and the LANE Services and between the LEC and other LECs. The LNNI specification defines the interface between LANE Services entities, i.e., LECs, LESs, BUSs, etc. In addition, LNNI defines a new LAN Emulation Service entity, i.e., the Selective Multicast Server (SMS), to enhance the handling of Multicast traffic.

A block diagram illustrating the relationship between LEC, LECS, LES, BUS and SMS entities in prior art Version 2.0 LAN Emulation services is shown in FIG. 3. Two LECs 40 are shown in communication with each other and to either of two LECS 42, LES 44 and BUS 46. In addition, both LECs and the LECS, LES and BUS communicate with a Selective Multicast Server (SMS) entity 48. Note that there can be more than one SMS per ELAN.

Note that in connection with the LNNI scheme, there may be several LECSs defined per administrative ATM domain in addition to several active LESs defined per ELAN. Each LECS maintains the list of currently active LESs. In case a LES fails, a mechanism is defined to ensure that all the LECSs are notified of the failure in order that none of the LECS assign LECs to non operational LESs. All the LECs previously connected to the failed LES are re-assigned by the LECS to other active LESs.

In the draft Version 2.0 of the LANE standard, the services include having multiple LECSs with each LECS having multiple ELANs. The LECs (clients) are apportioned across the LESs. Redundancy is handled by defining several LESs for the same ELAN, i.e., LES #1, LES #2, etc. The prior art redundancy method is described in connection with FIG. 2 that illustrates a portion of an example prior art Emulated LAN having a plurality of LECSs, LECs and LESs. The Emulated LAN, generally referenced 30, comprises LECS 18 labeled LECS #1 and LECS #2, LESs 16 labeled LES #1 and LES #2, BUSs 20 and LECs 14 labeled LEC #1, LEC #2 and LEC #3.

As described above, in the LANE Version 1.0 architecture (see FIGS. 1 and 2), the BUS is responsible for handling three types of traffic: broadcast, multicast and unknown unicast. The multicast traffic is generated by one or more applications that send their data to a group of receivers. The group of receivers does not include all the clients of the ELAN. For example, these applications include but are not limited to video broadcasting, distribution of data information, e.g., software distribution or push technology, video conferencing, remote learning, etc.

It is expected that these applications will increase in popularity in the near future. Therefore, the amount of multicast traffic is expected to also increase to a large extent. If multicast traffic were to grow, based on the LANE Version 1.0 implementation, the BUS would quickly become a bottleneck for traffic when the total amount of multicast traffic on the ELAN exceeds the forwarding power of the BUS.

Note that it is expected that in the near future Multicast traffic will become very heavy in networks. Broadcast traffic occurs mainly in the startup phase of the network and network elements. Once operating, little continuous broadcast traffic is generated. Similarly, unknown traffic is also not generated on a continuous basis. Unknown traffic is generated, for example, by a network element before a direct connection is established between two network devices.

In addition, multicast traffic is currently handled as broadcast traffic. All multicast traffic defaults to the BUS (to the LES for unicast traffic). In other words, regardless of the size and membership of the multicast group, a multicast message is broadcast to all the LECs and all members attached to the LECs.

To summarize, the disadvantage of LANE Version 1.0 is (1) the lack of true multicast capability (multicast is treated as broadcast) and (2) the lack of redundancy (if a LES or BUS fails the entire ELAN goes down). In particular, multicast traffic is limited by the forwarding capability of the BUS and by the slowest downlink to a LEC. Further, in switched edge device, all multicast traffic is distributed to all the ports.

Since, however, up till now relatively little multicast traffic was generated, the redundancy problem was considered far more important. Today, however, and in the near future the increase in multicast traffic generated by applications which cause the first problem, i.e., lack of true multicast, to become an important problem as well.

The LNNI portion of LANE Version 2.0 addresses these issues by providing a means of offloading the multicast traffic from the BUS. With reference to FIG. 3, this is achieved by the addition of one or more Selective Multicast Servers (SMSs) 48 that are responsible for handling multicast traffic.

A standard prior art SMS is constructed to perform the following functions. SMSs are designed to forward traffic on a packet level as opposed to forwarding traffic on a cell level. SMSs utilize a heavy protocol known as Server Cache Synchronization Protocol (SCSP). In LNNI most of the information between entities, i.e., LES, SMS, LECS, is transferred using this protocol. This protocol is needed to enable the SMS and LES to reside on different network devices. In addition, SMSs introduce themselves to the LECS and after obtaining the LES(s) from the LECS. After this first introduction they introduce themselves again to the LES(s) themselves. Further, SMSs must forward multicast traffic to the BUS to insure backward compatibility with non-SMS enabled LECs.

A block diagram illustrating the SAR of cells to and from packets in a prior art SMS system is shown in FIG. 4. The SMS, generally referenced 50, comprises, among other things, a segmentation and reassembly (SAR) unit 52. As described above, a major function (of the SMS is to receive and distribute multicast traffic. The SMS offloads this burden from the BUS that currently handles multicast traffic as broadcast traffic.

In operation, one or more LECs establish connections to the SMS 50. Cells 58 forwarded to the SMS from one or more LECs are received and input to the SAR 52. A reassembly unit 54 functions to reassemble the cells into packets 60. The cells are not forwarded until all cells comprising a packet are received. The SMS cannot multiplex different multicast traffic streams on the cell level, thus the requirement for an SAR in prior art SMS. It can, however, multiplex on the packet level.

Once all cells making up a packet have arrived, the packet is then segmented into cells 62 and distributed to each receiver, i.e., member, in the particular multicast group associated with the packet.

For traditional LAN traffic, AAL5 is the means used by which Ethernet and Token Ring frames are encapsulated into ATM cells. AAL5, however, does not provide any multiplexing capabilities. This means that cells derived from a particular frame are queued until all have arrived at the SAR before the packet is passed to the segmentation unit and transmitted as cells to the plurality of multicast destinations, i.e., receivers.

Note that in practice, the SMS may be implemented in various devices but typically, it is implemented in ATM switches. More than one SMS may reside in a network with each SMS residing on a different switch. The SMSs communicate with LESs via the SCSP protocol.

Initially, the LEC requests the LES for a destination for sending multicast traffic. The LES responds with the address of an SMS. The SMS maintains a list of Multicast Media Access Control (MMAC) addresses, wherein each MMAC represents a multicast group. It is possible that several SMSs serve the same MMAC so as to provide load balancing in the event the output demand exceeds any one SMS.

The LESs have knowledge of the locations of the SMSs and the MMACs handled by each. When an LE_ARP_ REQ message arrives at a LES from a LEC for a particular MMAC, the LES replies with the ATM address of the LES. If the LES does know about any SMSs, it sends the LEC the ATM address of the BUS. Thus, the BUS is the default in the event an SMS cannot be assigned.

In a network with multicast, the sending and receiving functions are independent of each other. In other words multicast connections may involve overlapping LECs or they may involve totally non overlapping LECs. The same LEC may function as a sender and a receiver for a single multicast connection or for multiple multicast connections.

Once the LEC obtains the ATM address of the SMS, it establishes a point to point connection to the SMS. The LEC then sends multicast traffic to the SMS over that connection (referenced 58), as illustrated in the example shown in FIG. 4.

For listening, the LEC issues an LE_REGISTER_REQ message for a particular MMAC and sends it to the LES. The LES, using the LNNI SCSP protocol, instructs the SMS to add the LEC to the point to multipoint connection.

A disadvantage of the above scheme is that the SMS is required to perform reassembly and segmentation of the cells into packets and back into cells. The SMS performs packet switching that involves the use of a combination of software and hardware. The need to process the packets using software creates a large potential bottleneck and a limitation on the forwarding capabilities of the SMS.

A further disadvantage is that the current prior art scheme is not scalable as three types of traffic, i.e., broadcast, multicast and unknown, are handled by a single entity. In addition, each LEC receives all the multicast traffic resulting in very inefficient utilization of bandwidth and the wasting of CPU resources on the end station due to the required software filtering of the MMACs.

SUMMARY OF THE INVENTION

The present invention solves the problems associated with the prior art by providing a system comprising a single sender SMS that collocates the SMS, used for forwarding multicast traffic, in the same device as the LEC. Thus, the LEC has associated with it a private SMS for exclusive use by it alone. This is in contrast to the prior art scheme of requiring multicast traffic to be sent first from the LEC entity to the SMS (located somewhere else in the network) and then having the SMS forward the multicast traffic to the receiving destinations. This prior art scheme required cells to be first reassembled into packets, processed by the SMS at the packet level and forwarded to the listener LECs after segmentation back into cells.

In contrast, the SMS of the present invention enables a LEC to distribute multicast traffic in the most efficient way possible. The multicast traffic is not sent from the sending LEC to the SMS over the network. Rather, the LEC communicates with the SMS directly via the operating system internal messaging subsystem or equivalent. Using the apparatus and method of the present invention, the multicast traffic is sent on a point-to-multipoint connection from the sending LEC via the SMS to all the receiving LECs interested in listening to a given MMAC. The interface between the local LEC and the collocated SMS utilizes a communications protocol that may or may not be standard. Any suitable communication means known in the art is suitable for use with the invention. The communication protocol chosen for use between the local LEC and the collocated SMS does not, however, effect other LECs that function as listeners. These LECs continue to utilize the standard LUNI protocol.

Collocating the LEC with the SMS provides for a much smaller delay of multicast traffic from sender to receivers. The magnitude of the reduction in the latency and throughout delay is equal to the time previously taken to transmit the cells from the LEC to the SMS, reassemble the packet and segment it back into cells as performed by prior art SMS devices.

A key feature of the present invention is the creation of an optimal path between the sending LEC and the receiving LECs. This is achieved by collocating the SMS in the same device, e.g., edge device, as the LEC. The LES, however, is located in a device typically separate from the device incorporating the LEC/SMS. The mechanism of the present invention enables a LES to assign a LEC exclusively to its private SMS while not permitting the assignment of any additional LECs to that SMS. Two alternative embodiments are disclosed that function to implement this mechanism.

In the first embodiment, the LEC internally has knowledge of the existence of the private SMS and is inhibited from issuing a LE_ARP_REQ to find the SMS. An entry is added to the database in the LES with an attribute of 'NOT_ASSIGNABLE' that effectively prevents the LES from assigning an LEC to that SMS.

In the second embodiment, address and LEC information is predefined for the SMS and propagated to all the SMSs. An entry is added to the database in the LES with an attribute of 'ASSIGNABLE_LEC' along with an associated ATM address of the one and only one LEC that the LES is permitted to assign to the SMS. This effectively prevents the LES from assigning a LEC other than the registered LEC to that SMS.

Advantages of the present invention include but are not limited to: (1) the creation of an optimal distribution path from the SMS to all the listener LECs (the path being optimal in the sense that for a given routing protocol, e.g., PNNI, etc., a more efficient path cannot be found); (2) configuration of the system is simpler as the SMS is collocated with the LEC thus eliminating the requirement of heavy communication protocols and associated links between SMS and LEC (the LEC can be configured with a private SMS); (3) the use of cell switching for the distribution of multicast traffic versus packet switching thus reducing the transmission delay; and (4) LANE Version 1.0 LECs and LANE Version 2.0 SMS LECs do not receive multicast traffic offloading the BUS and eliminating it as the bottleneck.

There is therefore provided in accordance with the present invention, in an Asynchronous Transfer Mode (ATM) network including LAN Emulation services capabilities, the LAN Emulation services including LAN Emulation Server (LES), LAN Emulation Configuration Server (LECS), a method of providing a private Selective Multicast Server (SMS), the method comprising the steps of collocating the private SMS with a sending LAN Emulation Client (LEC) in a network device, the sending LEC receiving a request to send multicast traffic to a Multicast Media Access Control (MMAC) received from a sending end station, the LES assigning the private SMS exclusively to the sending LEC such that no other LECs are assigned to the private SMS, the SMS establishing a point-to-multipoint connection to all listening LECs registered to receive from the MMAC and forwarding multicast traffic to the listening LECs via the point-to-multipoint connection.

The method further comprises the steps of initializing the SMS such that an entry is added to an associated SMS database having an attribute of 'NOT_ASSIGNABLE', synchronizing the SMS database with a LES database associated with the LES, preventing the LES from assigning LECs other than the sending LEC to the SMS and the LEC learning of the existence of the private SMS via means internal to the network device.

The method further comprises the steps of initializing the SMS such that an entry is added to an associated SMS database having an attribute of 'ASSIGNABLE_LEC' and comprising the ATM address of the sending LEC, the sending LEC being the sole LEC permitted to be assigned as a sender to the private SMS, synchronizing the SMS database with a LES database associated with the LES, the sending LEC issuing a LE_ARP_REQ to the LES for a particular MMAC, searching in a LES database for an entry indicating that there is a private SMS serving the sending LEC and the LES sending a LE_ARP_RES to the sending LEC with an indication to the sending LEC that the private SMS is collocated with the sending LEC.

The method further comprises the step of a receiving LEC requesting to receive from a MMAC comprising the steps of the LES receiving a LE_REGISTER_REQ message from the receiving LEC, the LES updating a LES database and issuing a LE_BREGISTER_RES to the receiving LEC, updating all SMS databases with changes made to the LES database and the SMS adding the receiving LEC requesting to listen to a MMAC as a leaf in its point-to-multipoint connection for that MMAC.

The method further comprises the step of stopping sending multicast traffic to a MMAC comprising the steps of the sending LEC indicating to the private SMS that it wishes to stop sending to a given MMAC and the SMS removing the point-to-multipoint data path.

The method further comprises the step of stopping listening to a MMAC comprising the steps of the LES receiving a LE_UNREGSITER_REQ from a receiving LEC, the LES updating a LES database and issuing a LE_UNREGISTER_RES to the receiving LEC, updating all SMS databases with changes made to the LES database and the SMS removing the receiving LEC from a corresponding point-to-multipoint connection for a particular MMAC.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

Figure 1:
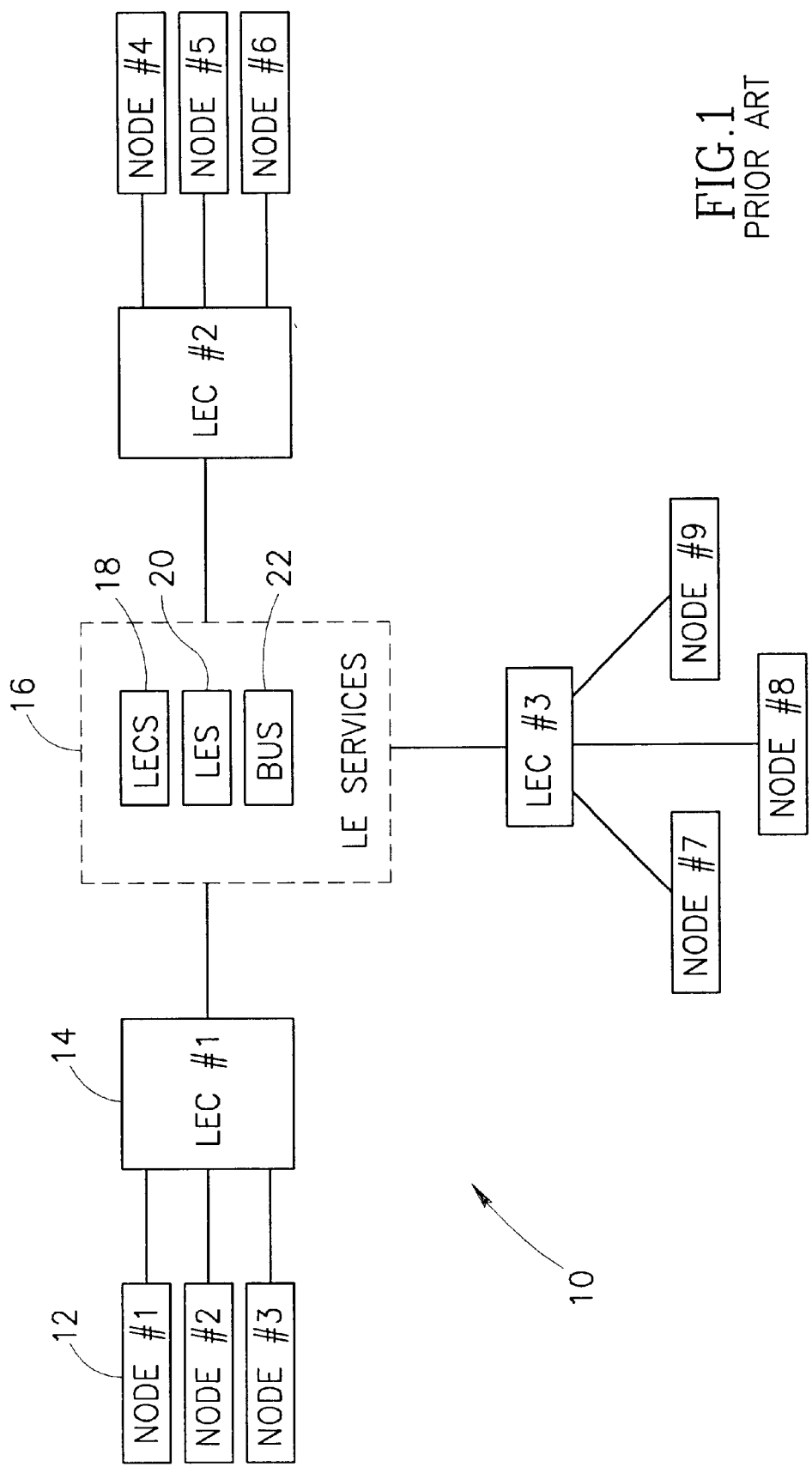
FIG. 1 is a block diagram illustrating prior art Version 1.0 LAN Emulation services available to nodes in an ATM network.
Figure 2:
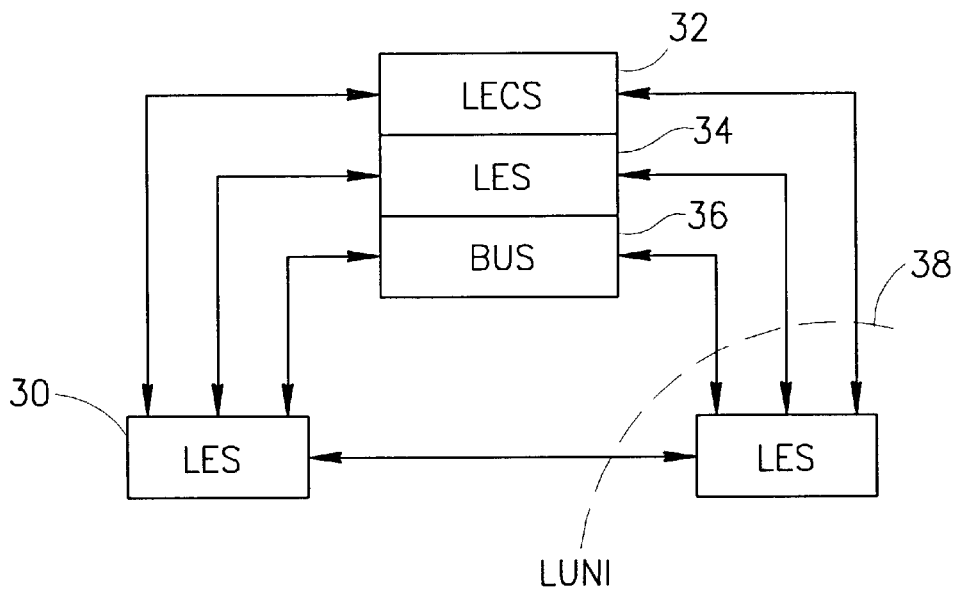
FIG. 2 is a block diagram illustrating the relationship between LEC, LECS, LES and BUS entities in prior art Version 1.0 LAN Emulation services.
Figure 3:
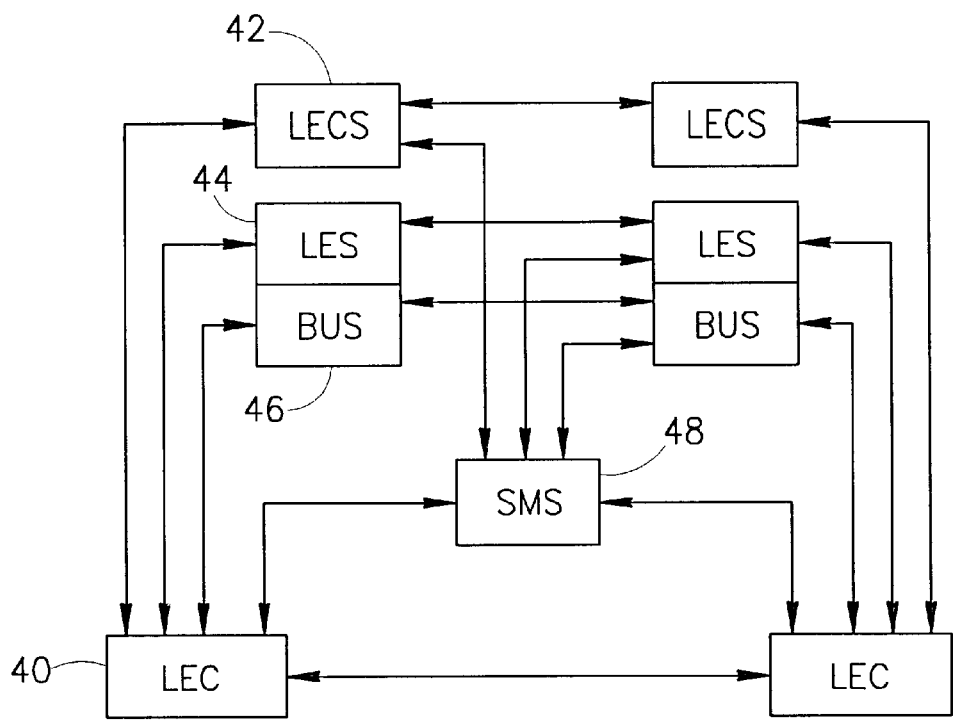
FIG. 3 is a block diagram illustrating the relationship between LEC, LECS, LES, BUS and SMS entities in prior art Version 2.0 LAN Emulation services.
Figure 4:
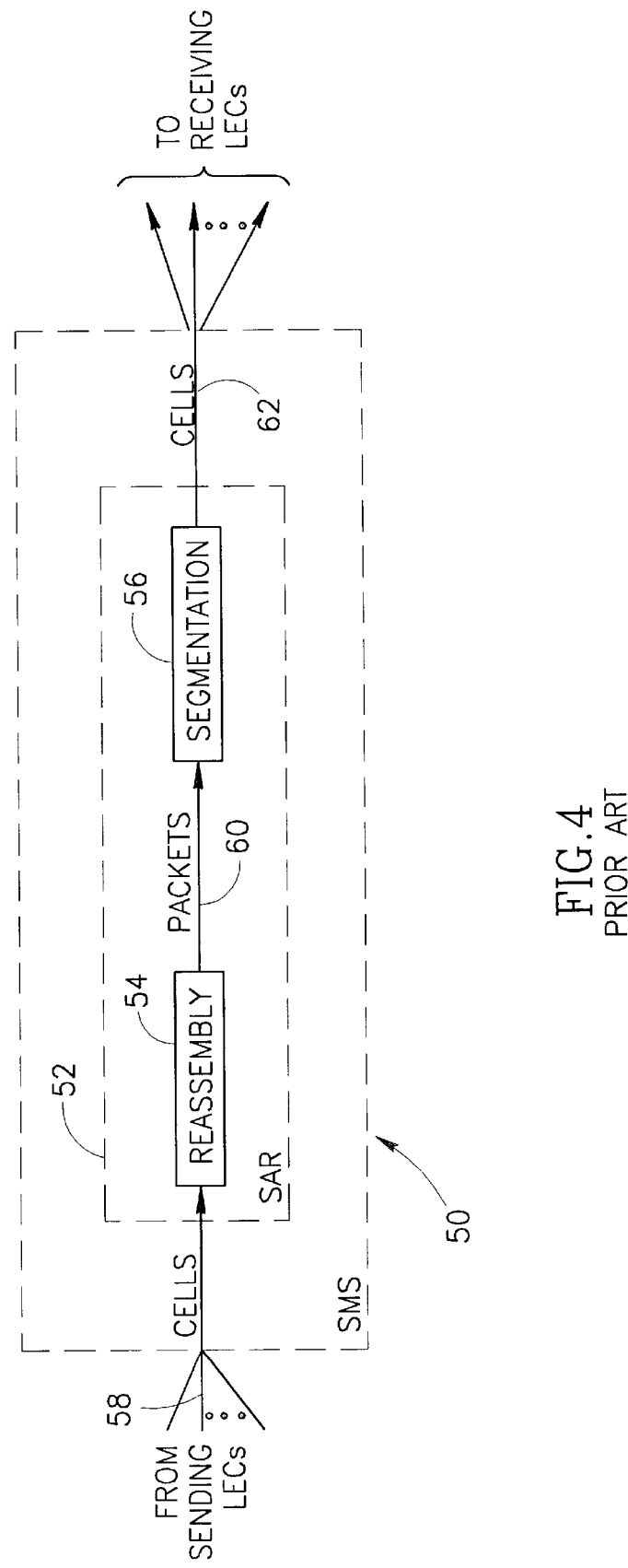
FIG. 4 is a block diagram illustrating the SAR of cells to and from packets in a prior art SMS system.

The following notation is used throughout this document.

| Term | Definition |
| --- | --- |
| ANSI | American National Standards Institute |
| ARP | Address resolution Protocol |
| ATM | Asynchronous Transfer Mode |
| BUS | Broadcast and Unknown Server |
| CCITT | Comite Consulatif International Telegraphique et Telephonique |
| ELAN | Emulated Local Area Network |
| FDDI | Fiber Distributed Data Interface |
| IETF | Internet Engineering Task Force |
| IISP | Interim Inter-Switch Signaling Protocol |
| ILMI | Integrated Local Management Interface |
| IP | Internet Protocol |
| IPX | Internetwork Packet Exchange |
| ITU | International Telecommunications Union |
| LAN | Local Area Network |
| LANE | LAN Emulation |
| LEC | LAN Emulation Client |
| LECS | LAN Emulation Configuration Server |
| LES | LAN Emulation Server |
| LNNI | LAN Emulation Network to Network Interface |
| LUNI | LAN Emulation User to Network Interface |
| MAC | Media Access Control |
| MMAC | Multicast Media Access Control |
| OS | Operating System |
| P2M | Point-to-Multipoint |
| PNNI | Private Network to Network Interface |
| PVC | Permanent Virtual Circuit |
| SAR | Segmentation and Reassembly |
| SCSP | Server Cache Synchronization Protocol |
| SMS | Selective Multicast Server |
| SVC | Switched Virtual Circuit |
| TLV | Type, Length, Value |
| UNI | User to Network Interface |
| VCC | Virtual Channel Connection |
| VCI | Virtual Circuit Identifier |
| VPI | Virtual Path Identifier |

The following definitions apply throughout this document. The term LEC denotes a LANE Version 2.0 LEC which is capable of utilizing an SMS for sending and receiving multicast traffic and which has been modified to run the multicast methods of the present invention. The term Version 1.0 LEC is used to refer to those LECs which do not have this capability. The term MMAC represents a Multicast Media Access Control address. The term stream refers to the multicast traffic that is sent by a particular LEC to a specific MMAC.

Single Sender SMS

The present invention solves the problems associated with the prior art by providing a system comprising a single sender SMS collocated with the LEC. The SMS distributes multicast traffic in a very efficient manner to all LECs that previously registered to listen to a particular MMAC. The SMS functions to create a point-to-multipoint (P2M) connection from the source LEC to all the destinations using standard ATM signaling and routing facilities, e.g., PNNI, IISP, etc. This is in contrast to the prior art scheme of transmitting multicast traffic from the LEC to the remotely located SMS that, in turn, forwards (i.e., switches) the multicast traffic at the packet level. The invention utilizes standard protocols of LUNI Version 1.0 and 2.0, e.g., the standard SCSP protocol to communicate between the SMS and the LES and between SMSs themselves.

To aid in understanding the principles of the present invention, the invention is described in the context of an SMS and collocated LEC incorporated within an edge device. Note, however, that one skilled in the art could implement the LEC and SMS entities in other types of network elements without departing from the spirit and scope of the present invention.

Figure 5:
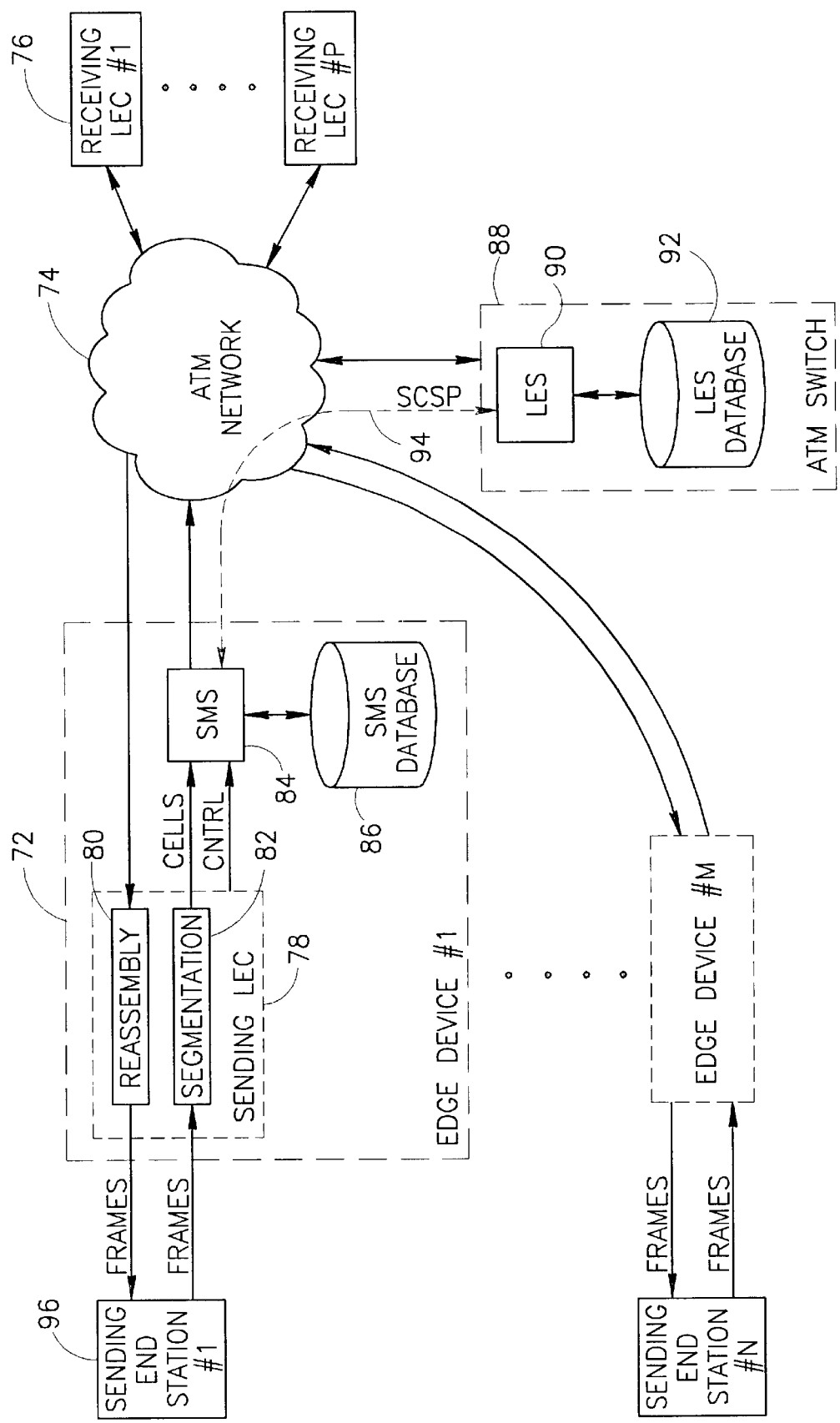
FIG. 5 is a block diagram illustrating an ATM switch incorporating a LEC collocated with a private SMS unit constructed in accordance with the present invention.

A block diagram illustrating an ATM switch incorporating a LEC collocated with a private SMS unit constructed in accordance with the present invention is shown in FIG. 5. The ATM communications network, generally referenced 70, comprises one or more sending end stations 96, labeled sending end station #1 through sending end station #M, one or more edge devices 72, labeled edge device #1 through edge device #N. Each sending end station 96 functions to send and receive frames to and from the LEC.

Each edge device 72 comprises LAN Emulation services including LEC 78 and SMS 84. The SMS 84 interfaces to an SMS database 86. The SMS database is adapted to comprise records for each MMAC served by the SMS. In the present invention, a SMS is limited to serving a single MMAC. Fields used for each record in the SMS database may contain, for example: the MMAC; an attribute (i.e., flag) indicating 'only assign one specific LEC to this SMS' which functions to guarantee that only one LEC will be assigned to the SMS; and the ATM address of the single LEC that is permitted to be assigned to the SMS.

The LEC 78 comprises reassembly and segmentation modules 80, 82, respectively. The reassembly module 80 functions to reassemble cells received from a sending LEC into frames for delivery to end station 96 when end station 96 is a registered listener for a MMAC. The segmentation module 82 functions to segment frames transmitted by the end station 96 into cells for transmission to one or more receiving LECs registered as listeners for a MMAC.

The edge device is connected to the ATM network cloud 74. One or more receiving LECs 76, labeled receiving LEC #1 through receiving LEC #P, are also connected to the ATM network 74. The system also comprises at least one LES 90 running within an ATM switch 88 or other network element. The LES 90 interfaces with a LES database 92 also located within the ATM switch 88.

The LES database is adapted to comprise records for each SMS it knows about in the network. Fields used to describe each SMS may contain, for example: the ATM address of the SMS; the MMAC address served by the SMS; and any flags such as distributed/standalone mode wherein several SMSs serve the same MMAC.

The LES database also functions to store information about MMACs and the LECs that have registered to that MMAC. The records may comprise fields for each MMAC, which includes: the MMAC; a list of all ATM addresses of the LECs that have registered to listen to the MMAC.

In operation, the SMS communicates with the LES via the SCSP protocol through the ATM network cloud 74 as shown in communication connection 94 (dashed line). The SCSP protocol is used primarily for database synchronization between the SMS and the LES and between the SMS and other SMSs.

A main feature of the present invention is that an essentially standard SMS runs on the same edge device as the LEC. All the control and synchronization portions of the SMS function similarly to those of a standard SMS. The SMS communicates with the LECS and the LES using standard LNNI interface protocol. Locating the LEC in the same device as the LEC enables a much more efficient data path to be created and eliminates the need to perform reassembly of the cells into and frames and segmentation of frames into cells (as performed in standard prior art SMS entities). The latency and throughout delay is improved by a magnitude equal to the time previously taken to transmit the cell from the LEC to the SMS, assemble the packet and segment it back into cells as performed by prior art SMS devices.

In accordance with the present invention, the LEC is assigned its own private SMS. In order that the SMS remain private to the collocated LEC, the invention provides a mechanism in the LES to permit the LES to assign a single LEC to its private SMS and to prevent the LES from assigning other LECs to that SMS.

The present invention comprises two methods for achieving the above functionality. In accordance with the first method, the LEC is adapted to learn about the existence of the private SMS and is inhibited from issuing a LE_ARP_REQ to the LES to find a SMS.

In accordance with the second method, the private SMS defines an element telling the LES which LEC may be assigned to it. The LEC issues the LE_ARP_REQ to the LES and, in response, the LES returns the ATM address of the SMS. The LES, however, is prevented from assigning other LEC to that SMS.

A key feature of the present invention is that the SMS is a single sender SMS. In other words, each instance of the SMS is adapted to handle only a single sender and creates a single P2M connection. If there are multiple senders for a MMAC, a separate SMS is instantiated, i.e., created, for each sender.

An advantage of the invention is that ELANs can be created without the need to predefine an SMS as the edge device creates an instance of the SMS on the fly in response to the LEC (via the LE_ARP_REQ or internal messaging, for example).

Using the method of the present invention permits a LEC to define its own private SMS. The SMS uses the SAR functionality, i.e., reassembly and segmentation modules, of the LEC. The invention is particularly applicable in cases where a LEC generates a very high volume of multicast traffic. The invention provides for optimal distribution of the multicast traffic since the distribution is carried out using a direct P2M connection for which the LEC is the root.

The sending and receiving LECs are minimally effected by the invention and may continue to utilize the standard LUNI protocol interface to LAN Emulation services. LECs performing the method of the invention utilize a Type, Length, Value (TLV) extension, as described in more detail hereinbelow. The invention also provides for optimal distribution of the multicast traffic generated by the sending end station by employing a direct P2M connection from the source (i.e., the sending LEC) to all the destinations. Further, use of the invention yields a smaller delay for delivery of the multicast traffic. The magnitude of the reduced delay is approximately the transmission time from LEC to SMS and the time spent assembling cells into frames and segmenting frames into cells.

The following is a description of a multicast API that can be implemented on the LECs using the LUNI protocol described in more detail in the ATM Forum LUNI Specification Version 2.0, incorporated herein by reference.

When a LEC desires to start sending data to a new stream it issues a LE_ARP_REQ message to the LES with the specific MMAC it desires to send to. After receiving the LE_ARP_RES message from the LES, the LEC establishes a point-to-point connection to the ATM address that appears in the $LE_{ARP}$_RES message. At that point, the LEC can start sending traffic to the established P2M connection.

When a LEC wants to receive multicast traffic destined to a given MMAC, it first issues an LE_REGISTER_REQ message to the LES with the particular MMAC. The LEC then expects to receive an ADD_PARTY_REQ message from one or more SMSs from which it will receive stream(s) for the particular MMAC. There may be multiple streams due to the fact that, in accordance with the invention, each SMS is a single sender SMS. Thus, MMACs with multiple senders might require the creation of multiple SMSs with each listener receiving several multicast traffic streams when more than one sender exists.

The above sending and receiving methods for both starting and stopping will now be described in more detail. The method described herein requires that the LEC run on the same device as the SMS.

SMS Initialization—Method#1

The following method comprises the initialization routine for the SMS for the first method whereby the LEC has internal knowledge about the existence of the private SMS. This method is performed during the initialization process of the edge device. In addition to the method described herein, the SMS performs a standard initialization process as described in the ATM Forum LNNI specification entitled LAN Emulation over ATM Version 2—LNNI Specification, incorporated herein by reference. Note that the LEC may discover the existence of the private SMS by a variety of ways apparent to one skilled in the art. For example, the existence of the private SMS may be coded in a non-volatile configuration memory whose contents are read during power up of the device.

Figure 6:
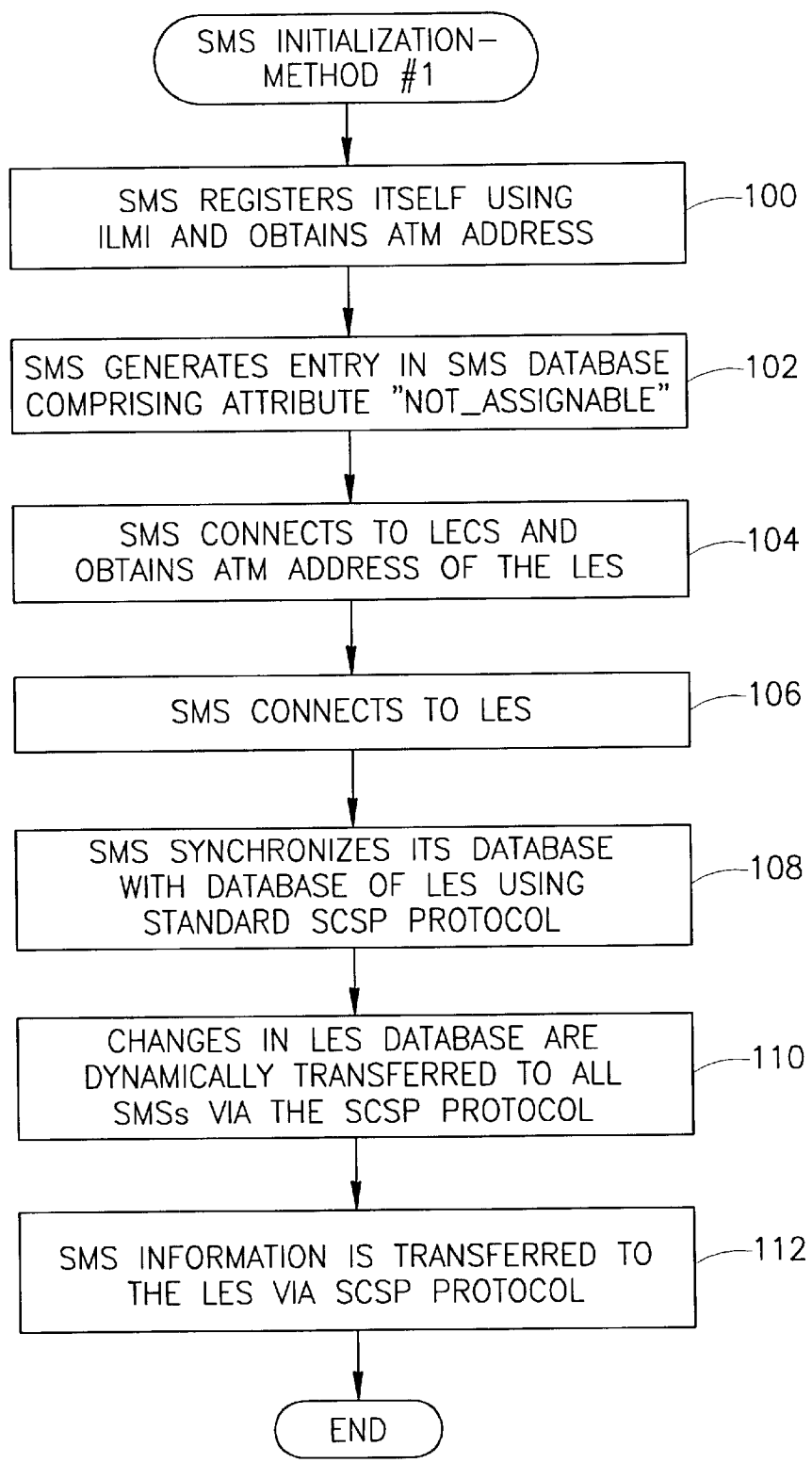
FIG. 6 is a flow diagram illustrating a first embodiment of the SMS initialization method of the present invention.

A flow diagram illustrating a first embodiment of the SMS initialization method of the present invention is shown in FIG. 6. Initially, the SMS registers itself using standard techniques, e.g., using ILMI, and obtains an ATM address (step 100).

The SMS generates an entry in its database 86 (FIG. 5) comprising an attribute 'NOT_ASSIGNABLE' which functions to tell the LES not to assign other LECs as senders to this SMS (step 102). Alternatively, the SMS may define the attribute such that it tells the LES that it is responsible for 'NONE' MMACs, thus preventing the LES from assigning additional LECs to the SMS.

The SMS connects to the LECS and obtains the ATM address of the LES (step 104). The SMS then connects to the LES (step 106) and synchronizes its database with the LES database 92 (FIG. 5) using the standard SCSP protocol (step 108). The result of the synchronization is that the SMS database is identical to the LES database. Note that a protocol other than the SCSP protocol may be used to synchronize the SMS and LES databases.

During the synchronization process, the LES receives the 'NON_ASSIGNABLE' attribute TLV and, in response, will not assign LECs as senders to that SMS. Note that changes in the LES database are dynamically transferred to all SMSs via the SCSP protocol (step 110).

It is important to note that the SCSP specification (an IETF standard protocol) permits customization to include the attribute TLV 'NON_ASSIGNABLE.'

Request to Start Sending—Method#1

Figure 7:
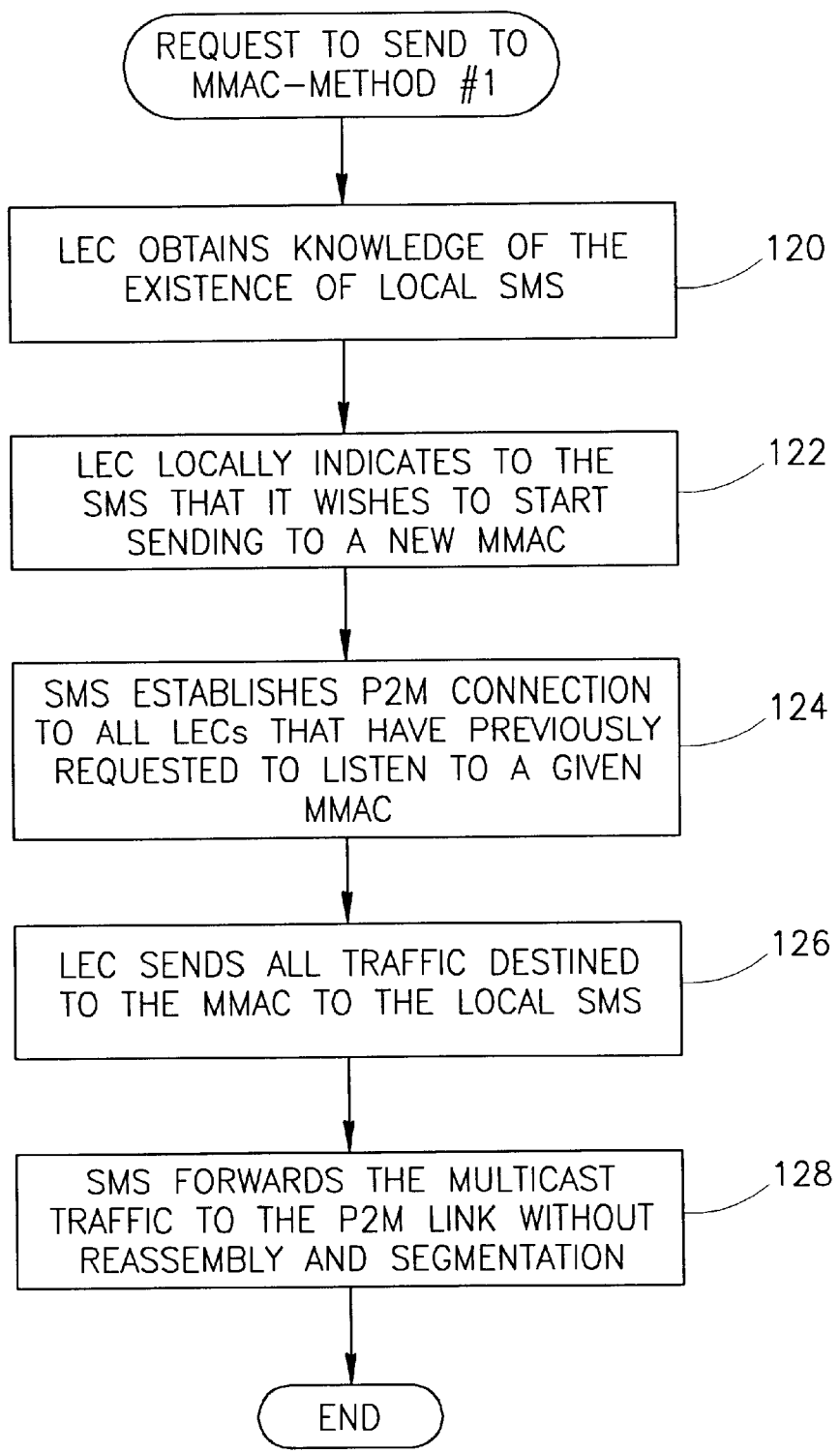
FIG. 7 is a flow diagram illustrating a first embodiment of the request to send to a MMAC method of the present invention.

A flow diagram illustrating a first embodiment of the request to send to a MMAC method of the present invention is shown in FIG. 7. This method is performed in the sending LEC which is adapted to not issue the LE_ARP_REQ to the LES since it obtains knowledge of the existence of the local private SMS via any suitable means such as via configuration memory (Flash memory) that is read during power up (step 120). The LEC, in response to traffic received from the sending end station, locally indicates to the SMS that is wishes to start sending to a new MMAC (step 122). Note that the MMAC is transferred as a parameter in this indication. The indication may be achieved using any suitable means such as via messaging within the operation system (OS) or via any notification means.

The SMS is operative to establish a P2M connection, using standard ATM signaling, to all the LECs that have previously registered to receive from the particular MMAC (step 124). This information is maintained in the SMS database and is updated using the standard SCSP protocol. The LEC then sends all traffic destined to that MMAC to the local SMS (step 126). The SMS is then operative to forward the multicast traffic to the P2M connection without performing reassembly or segmentation (step 128).

Note that the SMS delays establishing the P2M connection if no LECs have registered to listen to the MMAC. Upon the registration of the first LEC, the SMS establishes the P2M connection. Multicast traffic received for a MMAC without any listeners is discarded by the edge device.

Request to Start Listening

Figure 8:
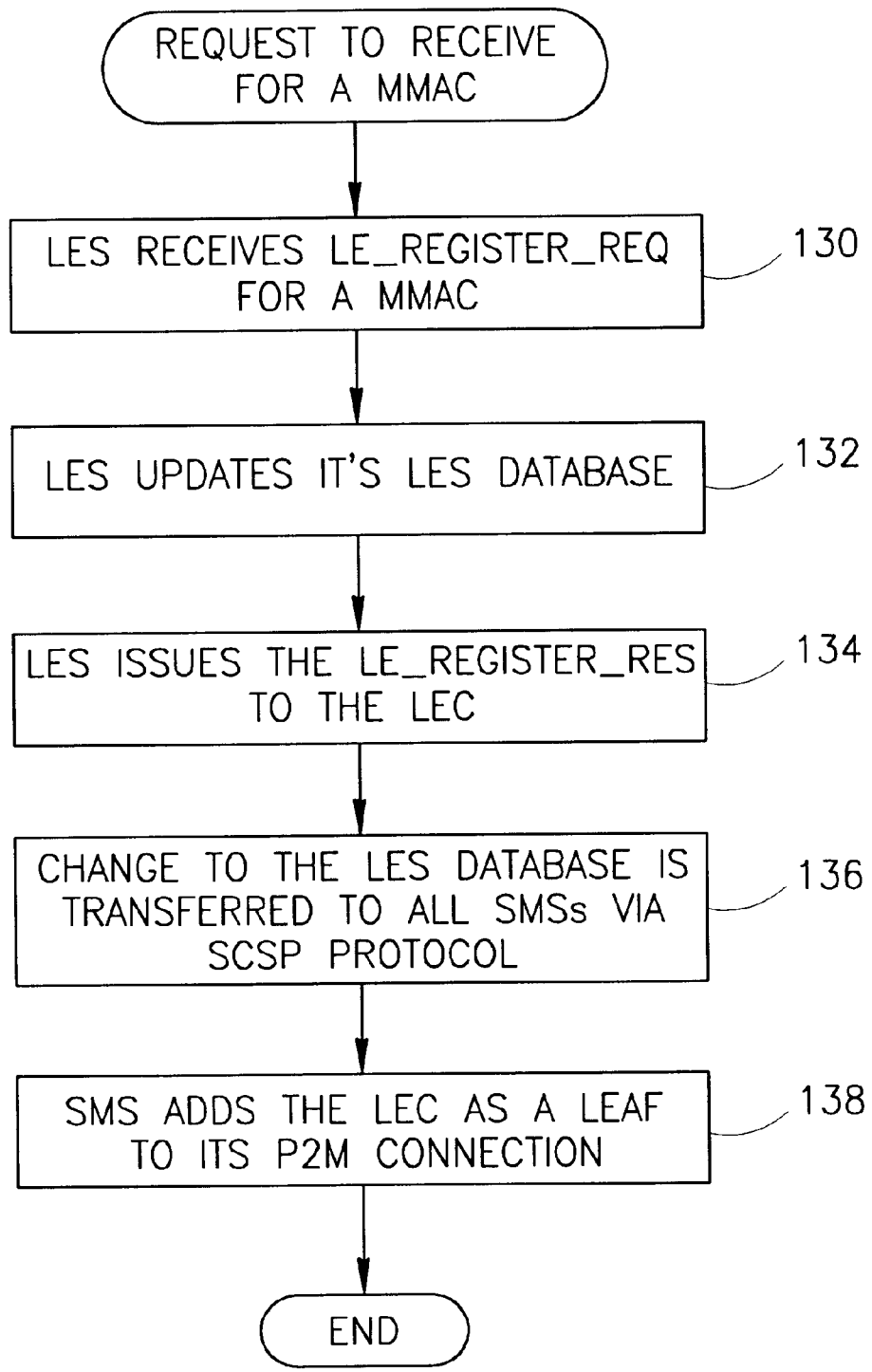
FIG. 8 is a flow diagram illustrating the request to receive from a MMAC method of the present invention.

A flow diagram illustrating the request to receive from a MMAC method of the present invention is shown in FIG. 8. Initially, the LES receives from a listener LEC a LE_REGISTER_REQ message for a particular MMAC (step 130). The LES then updates its database by adding a new entry for the MMAC (step 132). The LES then issues the LE_REGISTER_RES message to the listener LEC (step 134). The change to the LES database is propagated (transferred) to all the SMSs via the SCSP protocol (step 136). Each SMS is operative to filter the data received via SCSP for changes to be made in its database. Via the SCSP protocol, the LES database is synchronized with all the SMS databases regardless of the fact that the entry only effects a single SMS.

The SMS serving the particular MMAC, upon receiving notice of the newly added entry, adds the listener LEC as a leaf to its P2M connection distribution servicing the particular MMAC (step 138). Note that in the event there are no senders associated with the MMAC, the SMS only updates its database to include the new listener (receiver). If the listener LEC is the first for a MMAC, the request to receive will trigger the establishment of the P2M connection.

Request to Stop Sending

Figure 9:
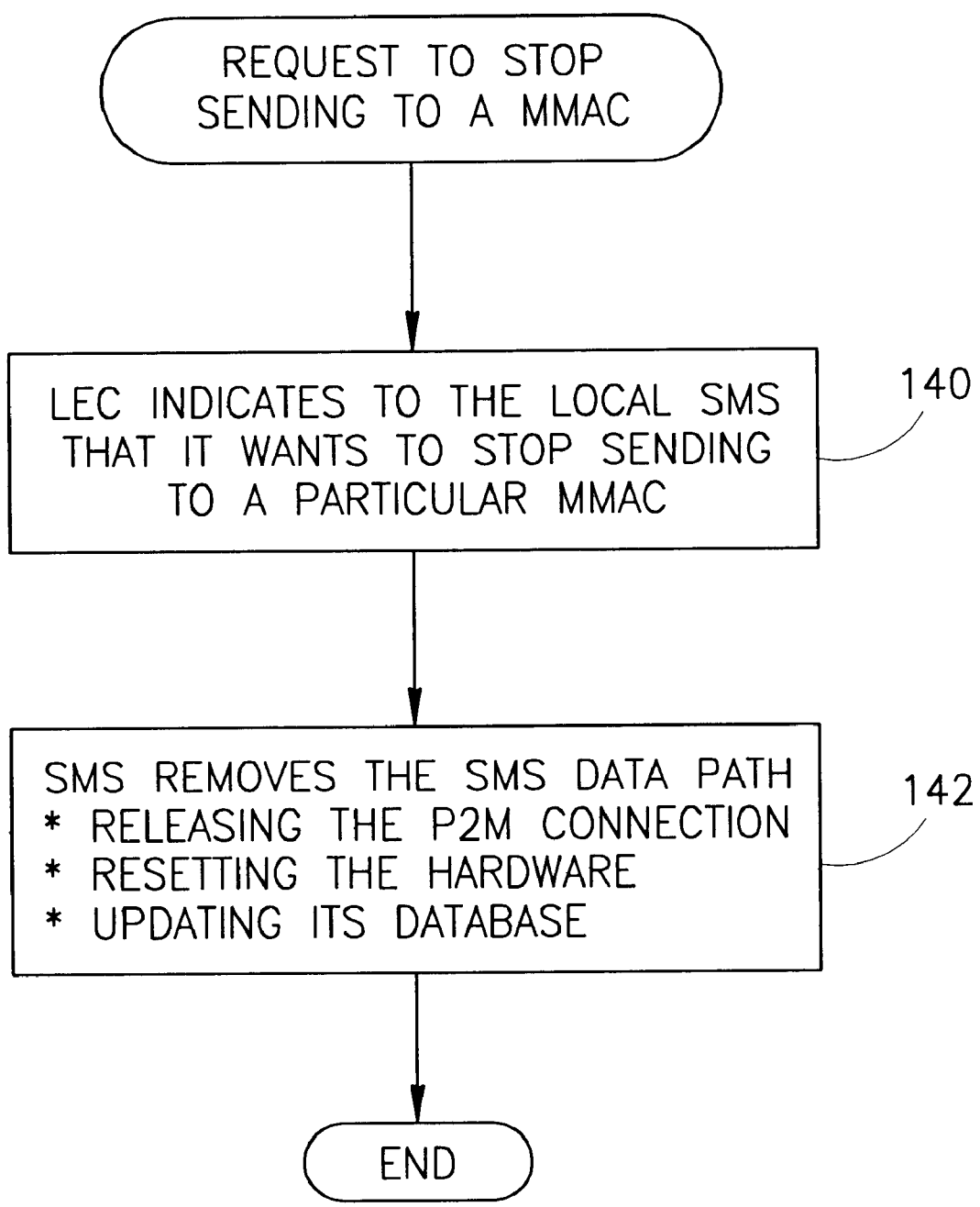
FIG. 9 is a flow diagram illustrating the request to stop sending to a MMAC method of the present invention.

A flow diagram illustrating the request to stop sending to a MMAC method of the present invention is shown in FIG. 9. The LEC indicates to the local SMS that it wants to stop sending multicast traffic to a given MMAC (step 140). The indication may be made using any suitable mechanism, e.g., operating system internal messaging subsystem. The SMS, in response, removes the SMS data path by (1) releasing the point-to-multipoint (P2M) connection, (2) resetting the hardware, i.e., resetting VPI/VCIs, internal flags, registers, etc., (3) clearing its database, and optionally (4) deregistering the ATM address of the SMS using ILMI to free the address for use in the future (step 142).

Request to Stop Listening

Figure 10:
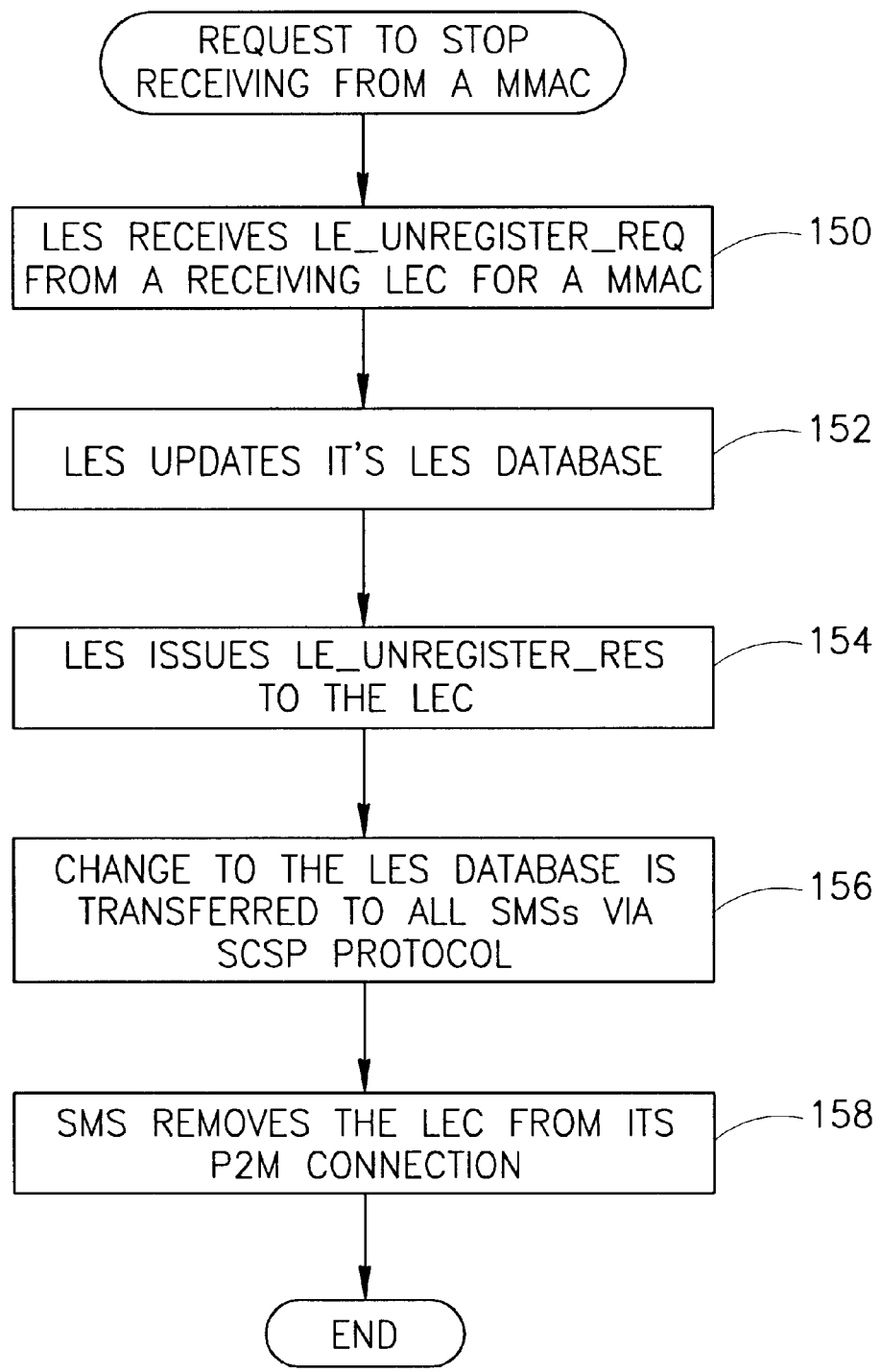
FIG. 10 is a flow diagram illustrating the request to stop receiving from a MMAC method of the present invention.

A flow diagram illustrating the request to stop receiving from a MMAC method of the present invention is shown in FIG. 10. First, the LES receives an LE_UNREGISTER_REQ message from a listening LEC for a particular MMAC (step 150). The LES, in response, updates its LES database (step 152). The LES then issues the LE_UNREGISTER_REQ message to the listening LEC (step 154). The change to the LES database is propagated (transferred) to all SMSs via the SCSP protocol (step 156). Each SMS is operative to filter the data received via SCSP for changes to be made in its database. Via the SCSP protocol, the LES database is synchronized with all the SMS databases regardless of the fact that the entry only effects a single SMS.

The SMS serving the particular MMAC, upon receiving notice of the listener LES requesting to stop listening, removes the given LEC from the P2M distribution connection servicing the particular MMAC (step 158). This can be implemented, for example, utilizing the 'DROP PARTY' signaling message.

SMS Initialization—Method#2

The following method comprises the initialization routine for the SMS for the second method whereby the LEC does not have internal knowledge about the existence of the private SMS. The method is performed during the initialization process of the edge device. In addition to the method described herein, the SMS performs a standard initialization process as described in the ATM Forum LNNI specification entitled LAN Emulation over ATM Version 2—LNNI Specification, incorporated herein by reference.

Figure 11:
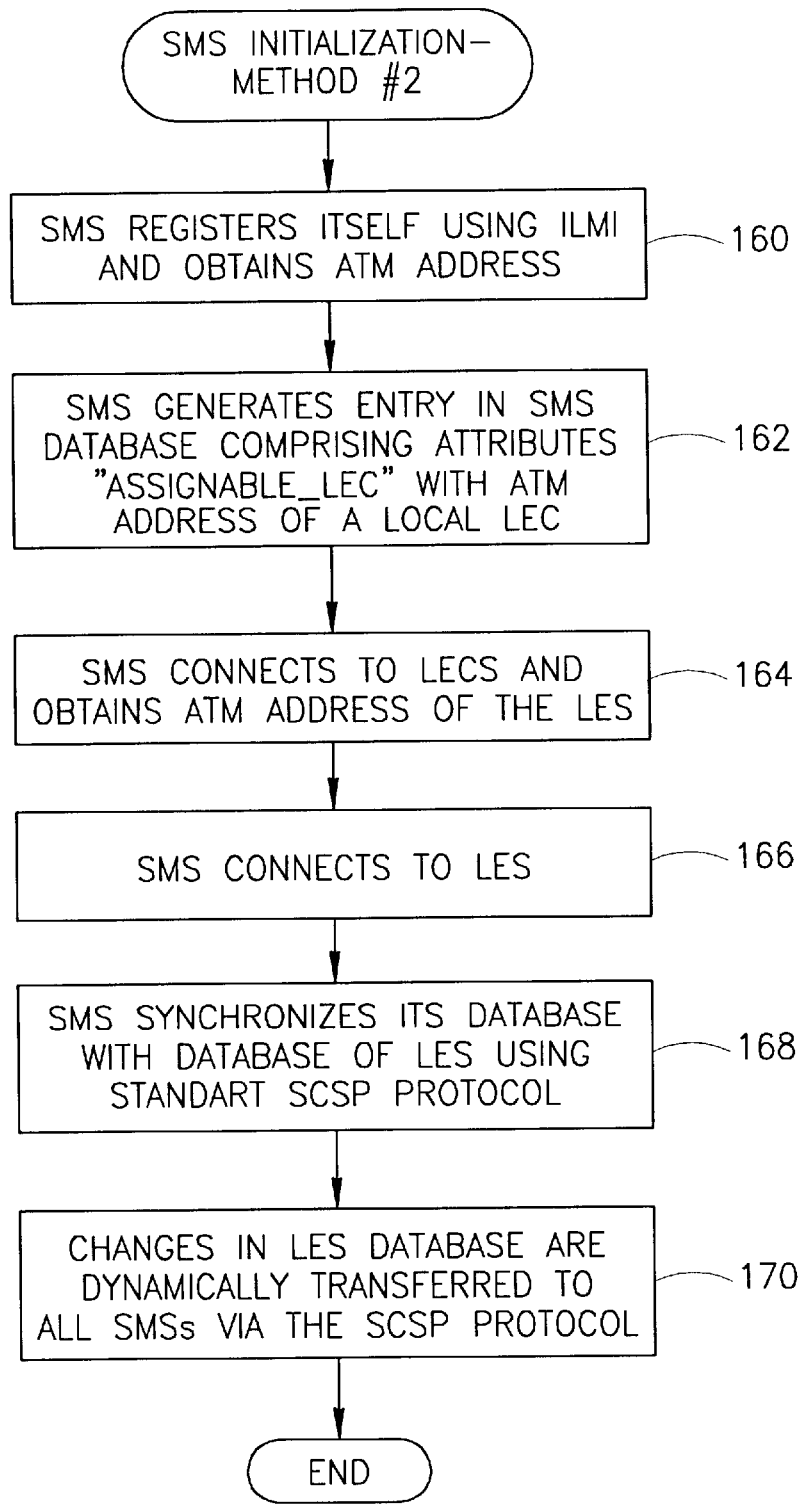
FIG. 11 is a flow diagram illustrating a second embodiment of the SMS initialization method of the present invention.

A flow diagram illustrating a second embodiment of the SMS initialization method of the present invention is shown in FIG. 11. Initially, the SMS registers itself using standard techniques, e.g., using ILMI, and obtains an ATM address (step 160). The SMS then generates an entry in its database 86 (FIG. 5) comprising a TLV including the attribute 'ASSIGNABLE_LEC' which functions to hold the ATM address of the only LEC which may be assigned as a sender to that particular SMS (step 162). This prevents the LES from assigning other LECs as senders to this SMS.

The SMS connects to the LECS and obtains the ATM address of the LES (step 164). The SMS then connects to the LES (step 166) and synchronizes its database with the LES database 92 (FIG. 5) using the standard SCSP protocol (step 168). The result of the synchronization is that the SMS database is identical to the LES database. Note that a protocol other than the SCSP protocol may be used to synchronize the SMS and LES databases.

During the synchronization process, the LES receives the 'ASSIGNABLE_LEC' attribute TLV and, in response, only assigns the corresponding LEC as a sender to that SMS. Note that changes in the LES database are dynamically transferred to all SMSs via the SCSP protocol (step 170).

It is important to note that the SCSP specification (an IETF standard protocol) permits customization to include the attribute TLV 'ASSIGNABLE_LEC.'

Request to Start Sending—Method#2

Figure 12:
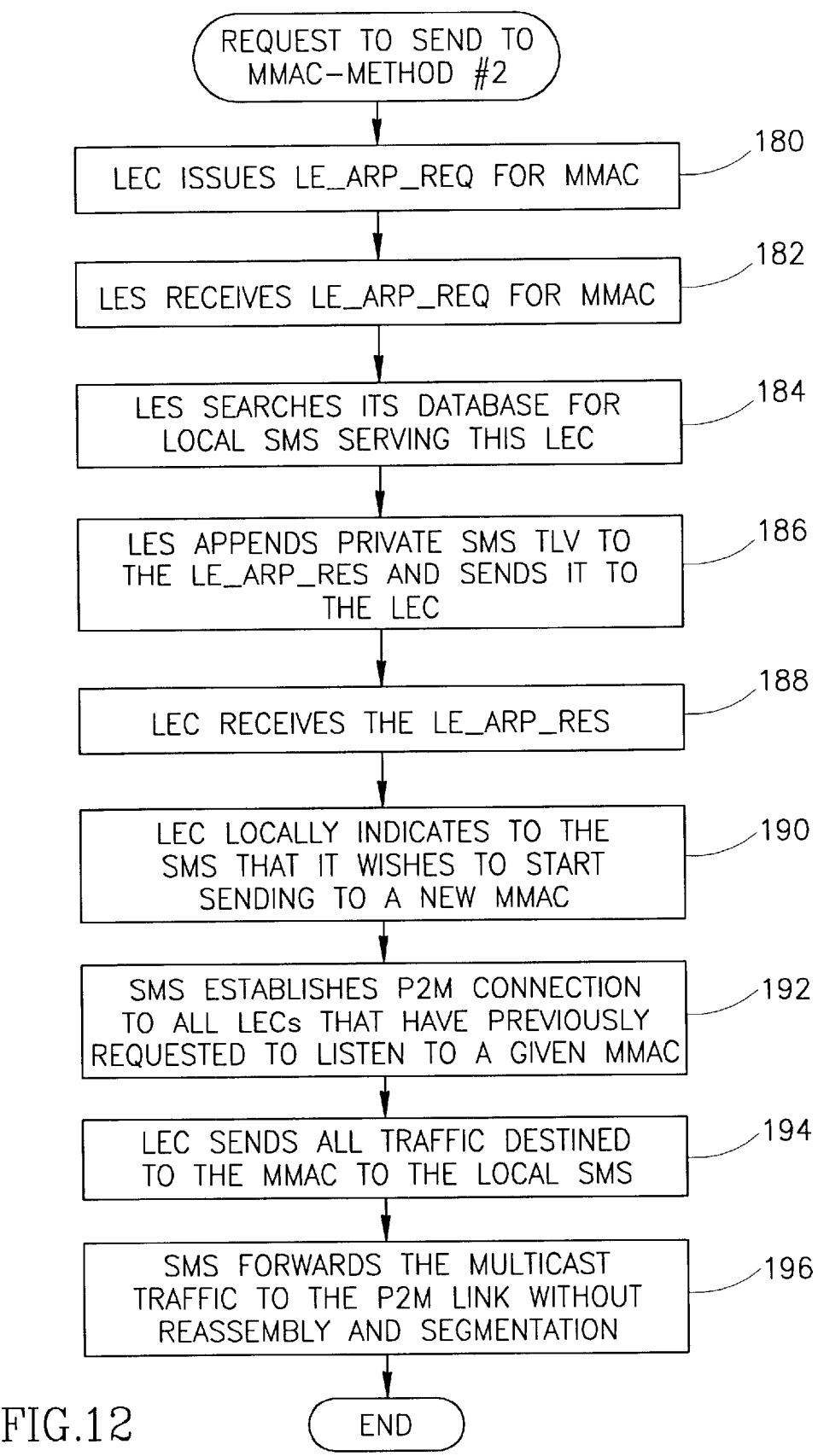
FIG. 12 is a flow diagram illustrating a second embodiment of the request to send to a MMAC method of the present invention.

A flow diagram illustrating a second embodiment of the request to send to a MMAC method of the present invention is shown in FIG. 12. This method is performed in the sending LEC. Initially, the LEC (which has a local private SMS) issues the LE_ARP_REQ to the LES for a particular MMAC (step 180). The LES receives the LE_ARP_REQ for the MMAC (step 182) and then searches its database for a local SMS serving this particular LEC (step 184). Since the SMS previously registered with the LES during the initialization process described above, the LES finds that a local SMS is serving this particular LEC, i.e., it finds an entry for the local SMS and the corresponding LEC previously assigned to it.

The LES then appends a PRIVATE_SMS TLV to the LE_ARP_REQ message and sends it to the sending LEC (step 186). The LEC receives the LE_ARP_RES message (step 188). The effect of the PRIVATE_SMS TLV is that it tells the LEC that a local SMS is collocated with the LEC. This prevents the LEC from attempting to access the SMS via an ATM address.

The LEC, in response to traffic received from the sending end station, locally indicates to the SMS that is wishes to start sending to a new MMAC (step 190). Note that the MMAC is transferred as a parameter in this indication. The indication may be achieved using any suitable means such as via messaging within the operation system (OS) or via any notification means.

The SMS is operative to establish a P2M connection, using standard ATM signaling, to all the LECs that have previously registered to receive from the particular MMAC (step 192). This information is maintained in the SMS database and is updated using the standard SCSP protocol. The LEC then sends all traffic destined to that MMAC to the local SMS (step 194). The SMS is then operative to forward the multicast traffic to the P2M connection without performing reassembly or segmentation (step 196).

Note that the SMS delays establishing the P2M connection if no LECs have registered to listen to the MMAC. Upon the registration of the first LEC, the SMS establishes the P2M connection. Multicast traffic received for a MMAC without any listeners is discarded by the edge device.

Scalability

In accordance with the ATM Forum LNNI Specification Version 2.0, the SMS must forward all multicast traffic to the BUS so as to enable backward compatibility with Version 1.0 LECs and to enable proper operation with non-SMS enabled LECs. The present invention, however, proposes not to forward multicast traffic from the SMS to the BUS as the standard based solution does not scale well.

The advantage of not forwarding the multicast traffic to the BUS, in accordance with the invention, is that the burden of handling multicast traffic originated by SMS capable LECs is removed from the BUS. Note, however, that it is important that non SMS capable LECs are not sent multicast traffic originated by SMS capable LECs. In either case, the scalability feature of the invention is optional and independent from the invention as described hereinabove.

While the invention has been described with respect to a limited number of embodiments, it will be appreciated that many variations, modifications and other applications of the invention may be made.

What is claimed is:

1. In an Asynchronous Transfer Mode (ATM) network including LAN Emulation services capabilities, said LAN Emulation services including LAN Emulation Server (LES), LAN Emulation Configuration Server (LECS), a method of providing a private Selective Multicast Server (SMS), said method comprising the steps of:

collocating the private SMS with a sending LAN Emulation Client (LEC) in a network device;

said sending LEC receiving a request to send multicast traffic to a Multicast Media Access Control (MMAC) received from a sending end station;

said LES assigning said private SMS exclusively to said sending LEC such that no other LECs are assigned to said private SMS;

said SMS establishing a point-to-multipoint connection to all listening LECs registered to receive from said MMAC; and forwarding multicast traffic to said listening LECs via said point-to-multipoint connection.

2. The method according to claim 1, further comprising the steps of:

initializing said SMS such that an entry is added to an associated SMS database having an attribute of 'NOT_ASSIGNABLE';

synchronizing said SMS database with a LES database associated with said LES;

preventing said LES from assigning LECs other than said sending LEC to said SMS; and said LEC learning of the existence of said private SMS via means internal to said network device.

3. The method according to claim 2, wherein said step of synchronizing utilizes the Server Cache Synchronization Protocol (SCSP) to communicate between said SMS and said LES.

4. The method according to claim 1, further comprising the steps of:

initializing said SMS such that an entry is added to an associated SMS database having an attribute of 'ASSIGNABLE_LEC' and comprising the ATM address of said sending LEC, said sending LEC being the sole LEC permitted to be assigned as a sender to said private SMS;

synchronizing said SMS database with a LES database associated with said LES;

said sending LEC issuing a LE_ARP_REQ to said LES for said MMAC;

searching in a LES database for an entry indicating that the private SMS is serving said sending LEC; and said LES sending a LE_ARP_RES to said sending LEC with an indication to said sending LEC that said private SMS is collocated with said sending LEC.

5. The method according to claim 4, wherein said step of synchronizing utilizes the Server Cache Synchronization Protocol (SCSP) to communicate between said SMS and said LES.

6. The method according to claim 1, wherein said indication comprises a PRIVATE_SMS Type, Length, Value (TLV) field that is appended to said LE_ARP_RES sent to said sending LEC.

7. The method according to claim 1, wherein said step of establishing said point-to-multipoint connection utilizes standard ATM signaling and routing functions.

8. The method according to claim 1, wherein multiple SMSs are associated with the same MMAC.

9. The method according to claim 1, further comprising the step of a receiving LEC requesting to receive from said MMAC comprising the steps of:

said LES receiving a LE_BREGISTER_REQ message from said receiving LEC;

said LES updating a LES database and issuing a LE_REGISTER_RES to said receiving LEC;

updating all SMS databases with changes made to said LES database; and said SMS adding said receiving LEC requesting to listen to said MMAC as a leaf in its point-to-multipoint connection for that MMAC.

10. The method according to claim 9, wherein said step of updating utilizes the Server Cache Synchronization Protocol (SCSP) to communicate between said SMSs and said LES.

11. The method according to claim 1, further comprising the step of stopping sending multicast traffic to said MMAC comprising the steps of:

said sending LEC indicating to said private SMS that it wishes to stop sending to said given MMAC; and said SMS removing the point-to-multipoint data path.

12. The method according to claim 11, wherein said step of removing said point-to-multipoint data path comprises the steps of:

releasing said point-to-multipoint connection;

resetting internal hardware registers within said network device; and updating said SMS database in said network device.

13. The method according to claim 1, further comprising the step of stopping listening to said MMAC comprising the steps of:

said LES receiving a LE_UNREGSITER_REQ from a receiving LEC;

said LES updating a LES database and issuing a LE_UNREGISTER_RES to said receiving LEC;

updating all SMS databases with changes made to said LES database; and said SMS removing said receiving LEC from a corresponding point-to-multipoint connection for said MMAC.

14. The method according to claim 13, wherein said step of updating utilizes the Server Cache Synchronization Protocol (SCSP) to communicate between said SMSs and said LES.

15. A private Selective Multicast Server (SMS) for use in an Asynchronous Transfer Mode (ATM) switch including LAN Emulation services capabilities, said LAN Emulation services including LAN Emulation Server (LES), LAN Emulation Configuration Server (LECS), said SMS comprising:

a sending LAN Emulation Client (LEC) collocated with said private SMS within a network device, said LEC operative to receive a request to send multicast traffic to a Multicast Media Access Control (MMAC) received from a sending end station;

said LES adapted to assign said private SMS exclusively to said sending LEC such that no other LECs are assigned to said private SMS;

a SMS data path adapted to establish a point-to-multipoint connection between said sending LEC and receiving LECs wishing to receive multicast traffic associated with said MMAC;

a SMS database coupled to said SMS for storing multicast related data; and means for forwarding multicast traffic to said receiving LECs via said point-to-multipoint connection.

16. The SMS according to claim 15, wherein said multicast related data comprises a MMAC field, a flag indicating 'assign only this LEC' and the ATM address of said sending LEC allowed to be assigned to said private SMS.

17. The SMS according to claim 15, wherein multiple SMSs are associated with the same MMAC.

18. The SMS according to claim 15, further comprising:

means for initializing said SMS such that an entry is added to an associated SMS database having an attribute of 'NOT_ASSIGNABLE';

means for synchronizing said SMS database with a LES database associated with said LES;

means for preventing said LES from assigning LECs other than said sending LEC to said SMS; and means for said LEC learning of the existence of said private SMS within said network device.

19. The SMS according to claim 15, further comprising:

means for initializing said SMS such that an entry is added to an associated SMS database having an attribute of 'ASSIGNABLE_LEC' and comprising the ATM address of said sending LEC, said sending LEC being the sole LEC permitted to be assigned as a sender to said private SMS;

means for synchronizing said SMS database with a LES database associated with said LES;

means for said sending LEC issuing a LE_ARP_REQ to said LES for said MMAC;

means for searching in a LES database for an entry indicating that the private SMS is serving said sending LEC; and means for said LES sending a LE_ARP_RES to said sending LEC with an indication to said sending LEC that said private SMS is collocated with said sending LEC.

20. The SMS according to claim 19, wherein said indication comprises a PRIVATE_SMS Type, Length, Value (TLV) field that is appended to said LE_ARP_RES sent to said sending LEC.

21. The SMS according to claim 15, further comprising means for a receiving LEC requesting to receive from said MMAC comprising:

means for said LES receiving a LE_REGISTER_REQ message from said receiving LEC;

means for said LES updating a LES database and issuing a LE_REGISTER_RES to said receiving LEC;

means for updating all SMS databases with changes made to said LES database; and means for said SMS adding said receiving LEC requesting to listen to said MMAC as a leaf in its point-to-multipoint connection for that MMAC.

22. The SMS according to claim 15, further comprising means for stopping sending multicast traffic to said MMAC comprising:

means in said sending LEC for indicating to said private SMS that it wishes to stop sending to said given MMAC; and means in said SMS for removing the point-to-multipoint data path.

23. The SMS according to claim 15, further comprising means for stopping listening to said MMAC comprising:

means for said LES receiving a LE_UNREGSITER_REQ from a receiving LEC;

means for said LES updating a LES database and issuing a LE_UNREGISTER_RES to said receiving LEC;

means for updating all SMS databases with changes made to said LES database; and means for said SMS removing said receiving LEC from a corresponding point-to-multipoint connection for said MMAC.

24. The SMS according to claim 23, wherein said means for removing said SMS data path comprises:
    means for releasing said point-to-multipoint connection;
    means for resetting a switch matrix integral to said ATM switch;
    means for updating a SMS database in said ATM switch; and
    means for unregistering an ATM address previously assigned to said SMS data path.

25. The SMS according to claim 15, further comprising means for stopping listening to said MMAC comprising:
    means for releasing said point-to-multipoint connection;
    means for resetting internal hardware registers within said network device; and
    means for updating said SMS database in said network device.

* * * * *